Sept. 15, 1925.
C. W. FRICK
TRAP
Filed Jan. 2, 1925
1,554,079
2 Sheets-Sheet 1
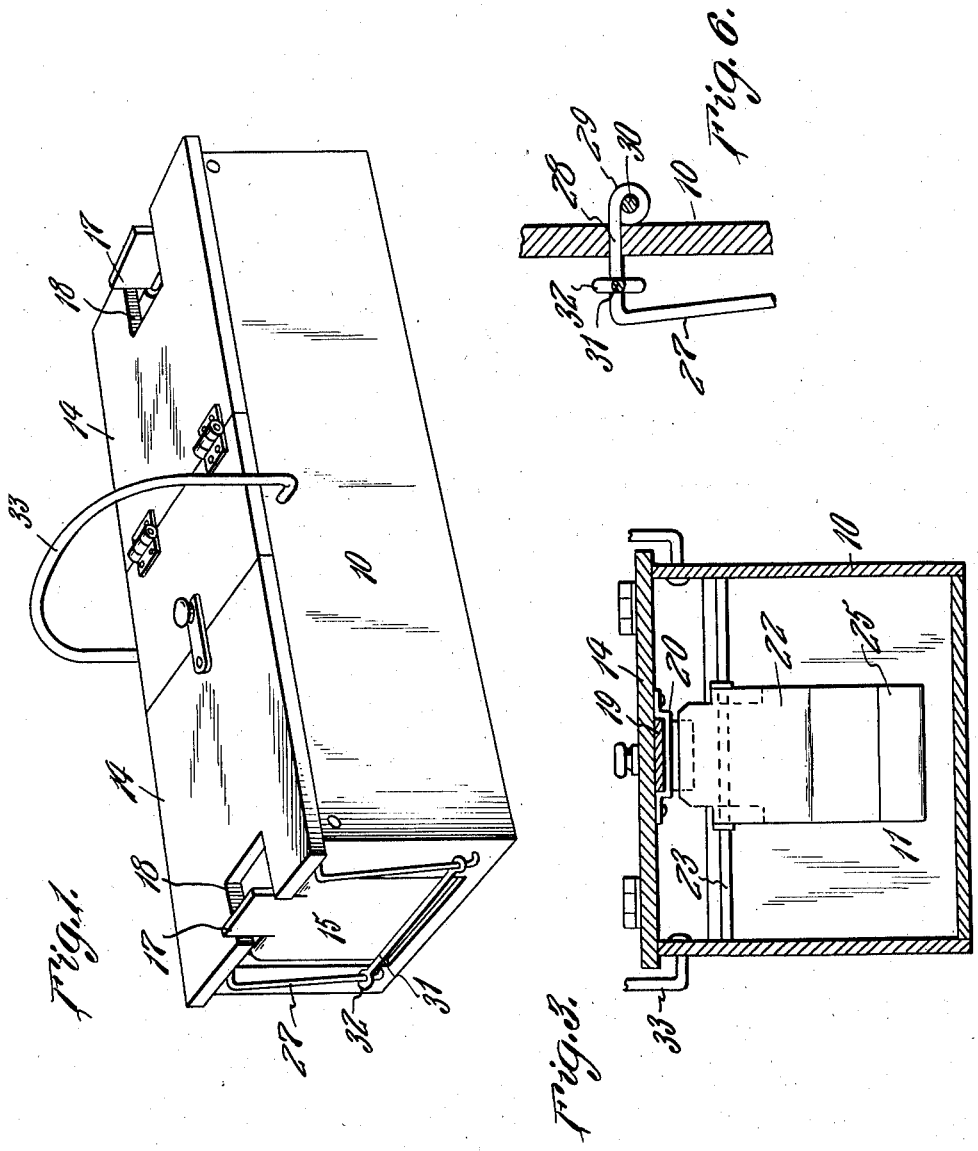
Inventor
C. W. Frick
By Victor J. Evans
Attorney Sept. 15, 1925.
C. W. FRICK
TRAP
Filed Jan. 2, 1925
1,554,079
2 Sheets-Sheet 2
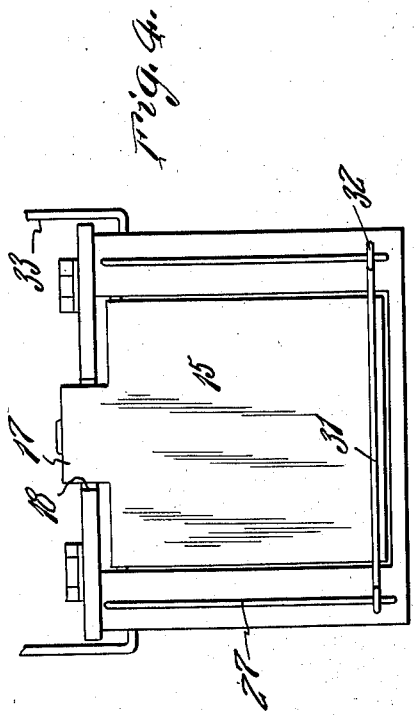
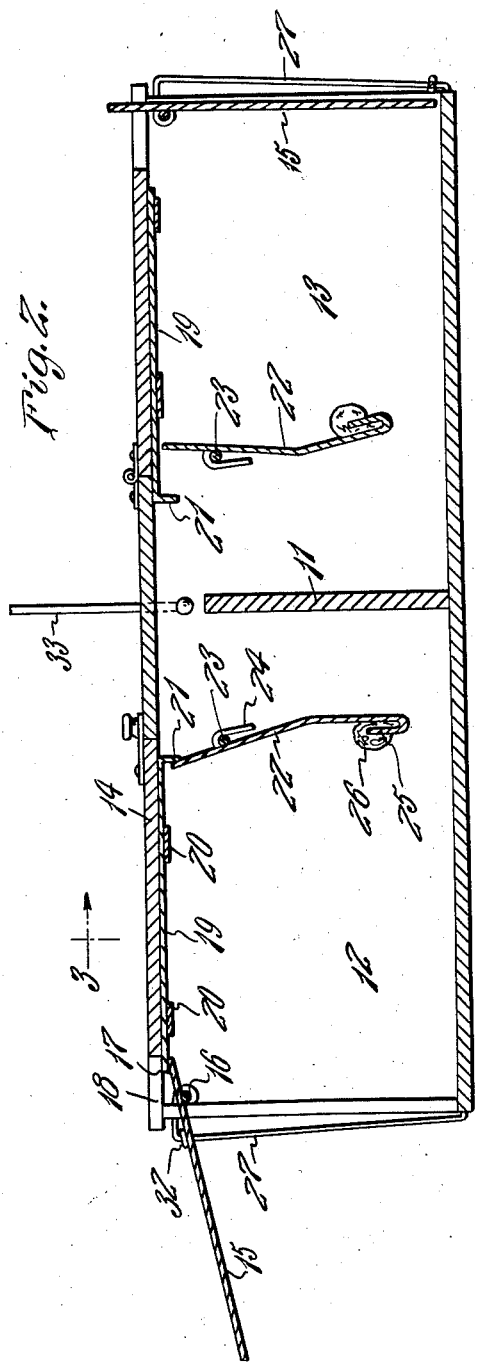
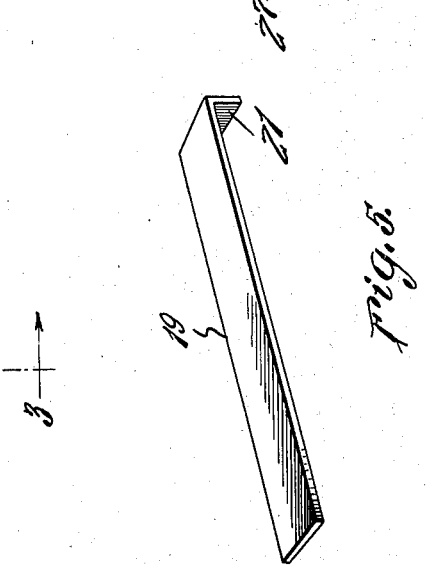
Inventor
C. W. Frick
By Victor J. Evans
Attorney Patented Sept. 15, 1925.

1,554,079

UNITED STATES PATENT OFFICE.

CHARLES W. FRICK, OF ST. LOUIS, MISSOURI.

TRAP.

Application filed January 2, 1925. Serial No. 225.

*To all whom it may concern:*

Be it known that I, CHARLES W. FRICK, a citizen of the United States, residing at St. Louis, in the county of St. Louis and State of Missouri, have invented new and useful Improvements in Traps, of which the following is a specification.

This invention relates to rat traps, and contemplates a box like casing having entrance openings in the opposite ends thereof, and a normally elevated door for each opening, each door being adapted to gravitate to a closed position, when released by an animal in an attempt to remove the bait from a holder, which controls the movement of the latch for the door.

Another object of the invention resides in the novel construction of means for automatically locking the door closed after the door has gravitated to its active position.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a perspective view of the trap showing the doors closed.

Figure 2 is a longitudinal sectional view showing the door at one end thereof held in its elevated position.

Figure 3 is a sectional view taken on line 3—3 of Figure 2.

Figure 4 is an end elevation of Figure 1.

Figure 5 is a perspective view of one of the latch elements.

Figure 6 is a fragmentary view showing how the locking element is normally positioned.

In carrying out the invention, I provide a box like casing indicated generally at 10, and which may be constructed from any suitable material and also vary in size without departing from the spirit of the invention.

The casing is preferably divided by a vertical partition 11 to separate compartments 12 and 13 respectively, and the top 14 is preferably made up of several movable sections to permit access being had to either or both of said compartments. The opposed ends of the casing 10 are opened for the admittance of the animal, and for each end I provide a pivoted door 15. Each door is pivoted upon a rod 16 arranged transversely of the casing adjacent the top thereof, and each door is also formed with an extension 17 which operates in a cutaway portion 18 formed in the top as shown in Figure 1. Each of these doors is adapted to be held normally in an elevated position in the manner shown in Figure 1, the means for holding the door in this position to be presently described, and adapted to be actuated by the animal after entering the trap in an effort to obtain the bait whereupon the door is released and allowed to gravitate to its closed position.

For each door I make use of a sliding latch bar 19 which slides in suitable guides 20 on the underside of the door 14. One end of each bar 19 is offset to provide a flange 21 adapted to be engaged by the adjacent end of a pivoted bait holder 22, when the bar 19 is moved to its active position shown in Figure 1. In other words, the bait holder 22 is arranged vertically within the bait compartment of the trap and is suspended from a transverse bar 23 for pivotal movement, the bar being provided with a hook 24 adapted to straddle the rod 23 as shown in Figure 1. The lower end of the holder 22 terminates to provide a hook 25 upon which the bait 26 is supported. Now, when the door 15 is elevated, the extension 17 thereof passes downwardly through the cutaway portion 18 of the top to allow the latch 19 to be moved to a position above the extension 17, and thus hold the door elevated. This arrangement is clearly shown at the left hand side of Figure 2, when the latch bar 19 is moved to the position just mentioned, the flange 21 is brought into engagement with the adjacent end of the bait holder 23, so that when the holder is rocked upon its pivot 23 in one direction, by the animal attempting to remove the bait 26 therefrom, the holder 22 slides the bar 19 in a direction away from the door 15, thereby releasing the door and allowing it to gravitate to its closed position. This construction is the same at both ends of the trap.

For the purpose of locking the door in a closed position to prevent the escape of the animal, I make use of a pair of spaced parallel rods 27 which are vertically disposed at the opposite sides of the door opening, and connected with the casing in any suitable manner. As shown in Figure 6, the corresponding upper ends of these rods 27 are offset as at 28, and are preferably passed through openings in the adjacent end wall of the casing, terminating to provide eyes 29 to receive the transverse rod 30 secured to the opposite sides of the casing. The offset extremities 28 are of a length to normally support a sliding rod 31, the ends of which terminate to form eyes 32 to receive the rods 27. When setting the trap, the door 15 at each end is elevated, and engaged by the latch bar 19 in the manner above described, which of course holds the door in its elevated position until released through the instrumentality of the bait holder 22. After the door has been opened, the rod 31 is moved off the extremities 28 by the rods 27 and arranged to repose upon the door 15 as shown in Figure 2. Consequently, when the door is released, it gravitates to its closed position, whereupon the rod 31 slides downwardly on the rods 27 to its position of rest, the final position of the rod being shown in Figure 4 wherein it will be noted that it extends across the lower end of the door 15 and thus prevents the door from being opened by the animal trapped in the casing 10. The trap in its entirety is provided with a suitable bail or handle 33 so that it can be carried from place to place.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

1. A trap comprising a casing open at both ends, and including a top having a cutaway portion adjacent each end, a pivoted door for each end of the casing, an extension projecting from each door and adapted to pass through the cutaway portion of the top when the door is elevated, a sliding latch bar mounted beneath the top and adapted to engage said extension to hold the door in an elevated position, a pivoted bait holder designed to engage and operate said latch to effectively release the door, when the animal attempts to remove the bait from said holder, and means for automatically locking the door when it assumes its closed position.

2. A trap comprising a casing open at one end and including a top having a cutaway portion adjacent said end, a pivoted door, an extension projecting from said door and adapted to pass through the cutaway portion of the top when the door is swung to an open position, a sliding latch bar mounted beneath the top and adapted to engage said extension to hold the door in an elevated position, and a pivoted bait holder designed to engage and operate said latch to effect a release of the door when the animal attempts to remove the bait from the holder, whereby said door gravitates to a closed position.

In testimony whereof, I affix my signature.

CHARLES W. FRICK.